United States Patent
Trell

(10) Patent No.: US 7,031,665 B1
(45) Date of Patent: Apr. 18, 2006

(54) METHOD AND DEVICE FOR UTILIZATION OF MOBILE RADIO TELEPHONES FOR SURVEILLANCE AND/OR CONTROL PURPOSES

(75) Inventor: Anders Edvard Trell, Stockholm (SE)

(73) Assignee: Anders Trell Trust, Buffalo, NY (US)

( * ) Notice: Subject to any disclaimer, the term of this patent is extended or adjusted under 35 U.S.C. 154(b) by 394 days.

(21) Appl. No.: 09/640,746

(22) Filed: Aug. 18, 2000

Related U.S. Application Data

(63) Continuation of application No. PCT/SE00/00689, filed on Apr. 11, 2000.

(30) Foreign Application Priority Data

Apr. 12, 1999 (CH) .................................... 9901299

(51) Int. Cl.
*H04Q 7/20* (2006.01)
*H04Q 7/32* (2006.01)

(52) U.S. Cl. .................... 455/70; 455/68; 455/418; 455/419; 455/420; 455/403; 455/410; 455/422.1; 340/5.7; 340/5.71; 340/5.73; 340/5.2; 340/5.1; 340/539; 340/531

(58) Field of Classification Search ................ 455/70, 455/410, 411, 66, 344, 345, 403, 409, 39, 455/500, 352, 422.1, 412.1, 412.2, 426.1, 455/426.2, 517, 550.1, 552.1, 575.1, 68, 455/418, 419, 420, 66.1, 445, 558, 90.3; 340/5.71, 5.72, 5.73, 5.1, 5.2, 5.3, 5.61, 5.64, 340/5.7, 531, 539

See application file for complete search history.

(56) References Cited

U.S. PATENT DOCUMENTS 5,541,585 A 7/1996 Duhame et al. ............ 340/825
6,072,402 A * 6/2000 Kniffin et al. .............. 455/344
6,161,005 A * 12/2000 Pinzon ....................... 455/403

FOREIGN PATENT DOCUMENTS

DE 29805758 U1 8/1998

(Continued)

*Primary Examiner*—Keith Ferguson
(74) *Attorney, Agent, or Firm*—Jacobson Holman PLLC

(57) ABSTRACT

A method and a device for utilization of mobile radio telephones for surveillance and/or control purposes in which a radio unit (3) for reception of signals from mobile radio telephones is arranged to be activated in a first step by an incoming signal from a mobile radio telephone, as a second step analysing the first part of received signal with regard to the PIN/SIM number (or corresponding) and/or inputted call number during the handshaking procedure between the mobile radio telephone and an associated base station for comparison with preprogrammed corresponding information, and as a third step, when correspondence has been established, initiate preprogrammed procedures and/or actions, and if non-correspondence is established, return to "resting" and non-activated condition pending a signal inputted from a mobile radio telephone. The receiving radio unit (3) is preferably performing a scanner function in "resting" condition with regard to within the geographical area utilized frequencies for mobile telephones, and performs a locking operation to the frequency for an incoming signal, maintaining this locking when approval for the third step is established, and returning thereafter, as well as when non-acceptance is established during the second or third step, to "resting" function with scanning of the frequencies. The reception range for used radio unit (3) is preferably maintained restricted during the first and second step, and extended during the third step, whereby reception of called subscriber can be accomplished from the base station communicating with the mobile radio telephone.

7 Claims, 2 Drawing Sheets

FOREIGN PATENT DOCUMENTS

| WO | WO93/14571 | 7/1993 |
| WO | WO94/01963 | 1/1994 |
| WO | WO98/06210 | 2/1998 |

* cited by examiner

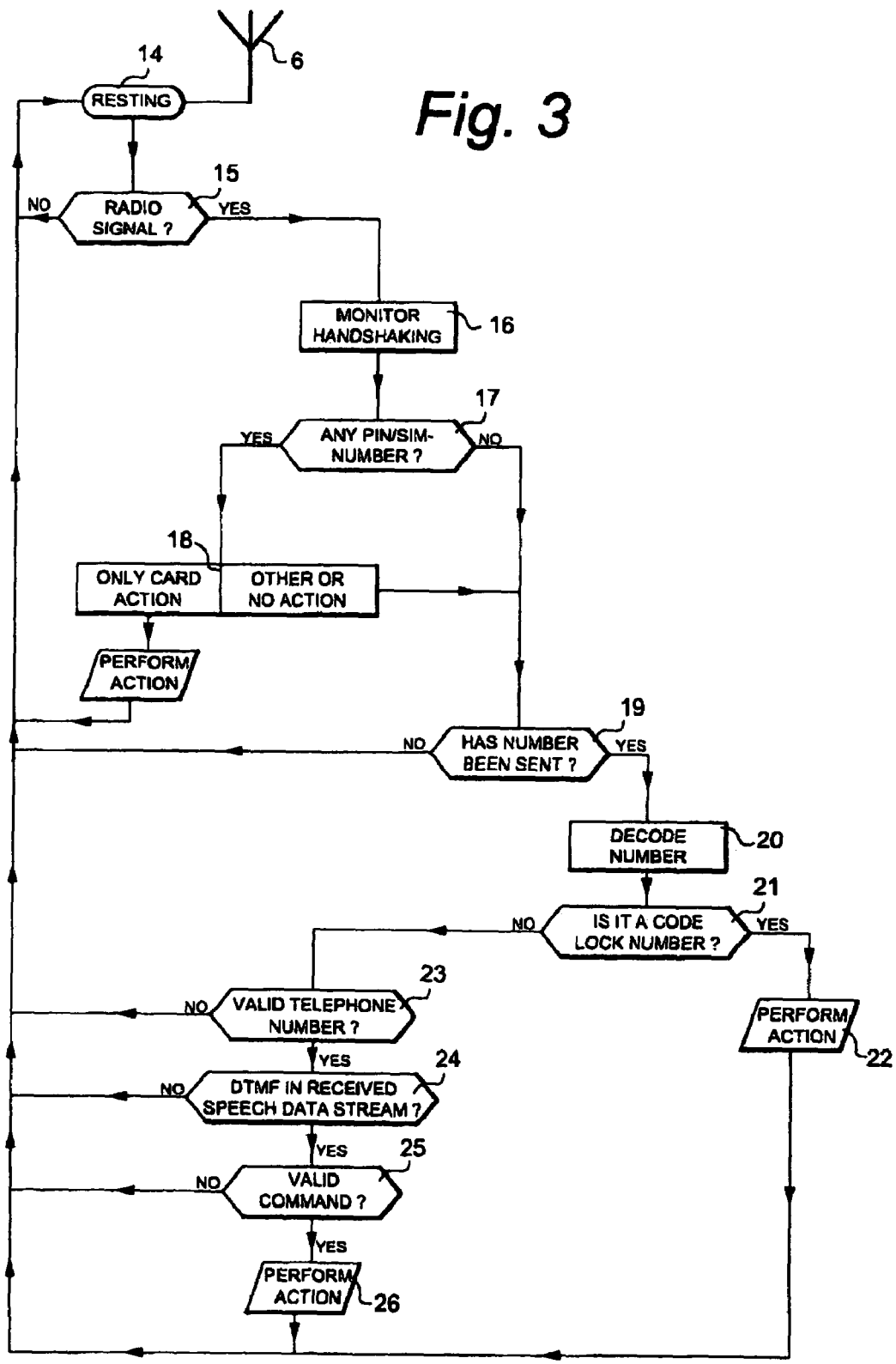

METHOD AND DEVICE FOR UTILIZATION OF MOBILE RADIO TELEPHONES FOR SURVEILLANCE AND/OR CONTROL PURPOSES

This application is a continuation of PCT/SE00/00689, filed Apr. 11, 2000.

TECHNICAL FIELD

The present invention is mainly related to a method and a device whereby commonly used radio (cellular) telephones facilitate various substantially physical types of services, and this is described, purely by way of example, for control of access, signalling, communication and e.g. entrance door lock opening for an entrance telephone system. However, also examples of other fields of use will be mentioned.

BACKGROUND ART

"Entrance telephones" used today are either arranged with installed fixed communication circuits ("local telephones") or connected to and switched through a public telephone network ("door telephones"). They exist basically due to a need for security and privacy while still offering a social possibility—for inhabitants in areas which require locked entrances due to various threats and risks in mainly highly populated areas, but they also involve certain disadvantages.

Local telephones are costly to install, wire and maintain; door telephones involve continuos costs for the building when used, and for reasons unknown are the local telecommunication authorities always attempting to create a number of obstacles for an economical installation. All of them include the disadvantage caused by externally available user units which are extremely sensitive for outer influence and vandalism, and, mainly for the same reason, most of these units are of loudspeaking types, "hands free", and often having a poor sound quality.

However, today a large part of the population, and rapidly increasing, carry a radio telephone ("cellular phone", "mobile (telephone)"), or may at least do so if there are sufficient reasons. These telephones have excellent communication, signalling and sound properties, but have so far lacked possibility of using these properties as a possibility to gain access/lock opening from a visitor's point of view.

DISCLOSURE OF INVENTION

It would be a major advantage to accomplish an entrance system, such as a door opening system, which is easy to install and maintain, having good sound quality, having a minimum of external physical user communication parts, which does not involve continuos fees for inhabitants and property owners for the use of the system etc., but instead allows a visitor's mobile telephone accomplish this. It is thus an object of the present invention to disclose a method and a device facilitating a functional system having simple installation, substantially only requiring connection to an electrical power source and a controlled device, such as a door lock, but which does not require external physical user communication means such as a microphone, loudspeaker and push buttons/keyboard, as well as wired communication circuits or connection to a communication network, but still offers complete and functional selective control of visitors/ entrance telephone services for intended building. A further object of the present invention is to give mobile telephones existing "out there" desired possibility for control of visitors/entrance telephone properties for a building having the aforementioned installation.

These and other objects, advantages and features of the present invention are for this special purpose (for intended purpose preferably by specially adapted devices) partly obtained by use of means known as "scanners", which today may for example include receiving capability for the entire GSM frequency range. Only the receiving capability of a scanner is required; since the communication properties of same according to the present invention are only utilized as a "passive" listener for data, same does not require analogue sound, nor transmitting possibility.

Since said scanner means are only receivers, they do not require any permit or licence to keep or use, and there are no laws prohibiting/preventing the use of same for technical solutions of the type described herein, nor any user fees, formal acceptances or similar. With regard to analogue radio telephones, such as NMT, it is only conventional radio reception, whereas for digital networks, such as GSM, certain signal processing is required. Without restricting the present invention (NMT and other "analogue" standards are used less and less, whereas "satellite", "broadband", "dual mode", "multi mode" and other "digital" standards are increasing), the invention will hereafter be described with reference to an embodiment for use with digital wireless communication systems named as "U.S. PCS 1900", "JAPAN PHS", "DCS 1800", "CT-2", "CT-2-CALL", "CT-3" and "DECT" and/or digital cellular communication systems named "IS-54B (ADC, D-AMPS, CDMA, IS-136)" in the United States of America, JDC in Japan and the global GSM-networks. The "scanning" radio receiver part according to the present invention must thus be in a position to handle the most frequently used mobile telephone systems within the area of use (and possibly facilitate upgrading to future specifications/protocols, for example "Bluetooth", "Maya", "Chat", "e-mode", "3G", "SMS", "WAP (/MEXE)", "iDEN", "IMT-2000", "GMPCS", "GPRS", "UMTS", "FDMA", and "(W) CDMA" with "FH/SS", "DS/SS" and "CO FDM"), but in order to simplify the non-restricting description, GSM has been chosen. GSM is a commonly used standard for mobile telephones. In accordance with a so called "protocol", a format is used denominated MultiCarrier(MC)/Time Division Multiple Access (TDMA)/Time Division Duplex (TDD) for radio communication between the units, such as mobile telephones and base stations, which are connected to a public telephone network. Mobile radio telephone systems are restricted to use certain frequency ranges for communication, and mobile telephones transmit and receive at separate frequencies (cellular) or "time frames" (DECT) in order to accomplish speech with "full duplex".

Since mobile telephony is radio communication, same can be intercepted by devices known as scanners, which operate by continuously proceeding search of the radio frequency spectrum or chosen parts thereof, and which detect and "lock" on active channels, and submit intercepted sound to a listener. In the case with analogue radio, the communication is immediately understandable, but with regard to digital communication, such as GSM, the output would be a meaningless noise, unless they are capable of performing a speech and signal data decoding operation with use of the same protocol as used for the intercepted signal. In the case of GSM, such scanners are today commercially available, which are also capable of detecting the number dialled from the mobile telephone and also to disclose their individual and unique PIN (a subscriber's personal identification number—"International Mobile Subscriber Identity"—IMSI)/SIM number, particularly in the case when the mobile telephone is switched on from an off condition and when "hand shaking" is performed with the base station located closest to the subscriber with use of a few basic protocols, when also the protocols to be used for a subsequently following telephone call are disclosed to an initiated listener. Accordingly, even though it is technically possible according to the present invention to perform required scanning/"tapping" of mobile telephones that are "switched on". It is preferred and described that a visitor should initiate the access control procedure by switching on a "disconnected" mobile telephone closely adjacent to the entrance to which access is desired. This results in many advantages.

Firstly, that the visitor's mobile telephone is located in such a close relationship to the entrance as a normal entrance request situation requires, before same can be detected, prevents all other persons switching on their mobile telephones in an adjacent area from addressing or initiating the system according to the present invention. The antenna used by the system can thus be well screened, being directional and having a short reception range.

Secondly, a "switched of" mobile telephone which is switched on also acts as a starting or activating unit for the system, apart from the fact that same generously gives away the protocols facilitating an "entrance call".

The radio receiving "scanning" unit in the described system will, being activated, perform scanning in/locking on assigned radio channel (frequency) for communication and perform synchronization with transmitted time divided TDMA parcels. It may thus detect, decode and handle the number that the visitor will dial in order to make a request for access to the building. This number is typically the telephone number of a tenant living in the building. A programmable device, "number discriminator", compares this number with preprogrammed numbers—normally the telephone numbers of the tenants and/or other persons authorized to unlock the door—and if these numbers correspond, the door lock is allowed to receive and be activated by an unlock command. Should the numbers not correspond, and provided that the dialled number was a telephone number, same results in a conventional telephone call between the calling party and the called party, while the described system does not respond to any control commands. On the other hand, should the numbers correspond, a call can be started between the calling and called party (provided that a reply is obtained), whereby the calling party may identify himself and request permission to enter, whereafter the called party has possibility to allow this by sending adequate control signals back via the established connection—preferably as a DTMF digit sequence or code sequence—which can be detected and decoded by the locked, synchronised and listening scanner radio part of the system, which "listens in" to the entire communication between the parties concerned (via the base station) and may thus, preferably during a predetermined time period, detect DTMF signals and act in response to same, as well as, since it may require that valid DTMF signals must be in the correct frequency/time slot, secure that only the called party can transmit DTMF signals influencing the system. (other means of protection can be to disregard valid DTMF signals at T-frequency, or rather, in GSM and unless DTMF:s are acoustically being loaded into the visiting mobile's "mic" from a tone generator, the DTMF instructing signal messages which a mobile telephone transfers to the base station in order to make same produce DTMF signals to the replying telephone, this in case of attempts to force the system, strong feedback, echoes or side tone; or a required certain dB-level to cause acceptance). Since DTMF makes it very simple to give numerous types of commands, also other functions apart from opening a door lock can be accomplished, e.g. start of a camera, alarm transmission, switching on a light source etc. by commands from the called party, and such functions only require system programming and that required hardware for such functions are made available.

The system according to the present invention thus operates in synergy with the mobile telephone call, it does not take any part in any telephone communication, to which it is only acting as a passive listener, and when reacting on stimulus from same, it does not influence the actual conversation, which is carried out and completed (logically after intended result) by the parties concerned, and furthermore is the call without charges for the building—normally is the visitor charged to call fee unless a 1-800 (free of charge) number is offered, whereby the need for a communication unit for visitors no longer exists, such as a keyboard, microphone and loudspeaker—and furthermore will excellent sound quality be achieved, well suited for use in an area having street sounds. Since conventional telephone numbers are used, no list of numbers is required, which favours welcome visitors, who normally knows the person to be visited and the telephone number of same, as well as the need to bring a mobile telephone. Since the described system has a number discriminator for storage of different numbers, it can also offer a code lock possibility, as is the case with known entrance telephone systems. This is advantageous for tenants, service personnel etc., as well as to give tenants having no telephone a possibility to let in visitors by giving them a door opening code. The system according to the invention can obviously also include a keypad, for addressing a code lock, but this would mean additional hardware and an external user influenced unit which is sensitive for influence/damage. A number dialled from a mobile telephone must not necessarily be a functioning/existing telephone number which is transferred to the base station (or in the air). All numbers dialled are transmitted after a command and "authenticated" (authentication) by the base station, and by preferably starting/ending with a non-numerical part such as "*"or "#" it will, as disclosed above, reach and be understood by the described system. Should this number correspond to a number stored in the number discriminator for a certain code lock purpose, intended function can be performed, in the same way and with same advantages, e.g. time zones, as for a code lock having a keypad, even though no keypad exists. A possible disadvantage would be that both tenants and service personnel must carry mobile telephones to use this, but this can be motivated by costs and the advantage of security against damage. Since the base station according to the GSM protocol first authenticates the "mobile" and thereby makes it possible for same to "send out" a dialled number, security against copy transmissions from a possible intruder is also reasonably high. The level of security can be increased further, if the code lock function first must be initiated by "switch on" of a "mobile" followed by handshaking between same and the base station, as discussed in otherwise in this description. Furthermore may "rolling" variable codes, time zones etc. be used to safeguard the authority. In any case, since no telephone calls take place, due to the fact that same is interpreted by the base station as "wrong number", the use is free of charge. Another additional feature of existing entrance systems is often a card reader facilitating entrance for persons having valid cards, which in conjunction with a code lock result in different "levels" of security, namely "card only", "code sequence" or "card-plus-code sequence", apart from the fact that it is smart, fast and practical, particularly for company staff. A system according to the present invention can obviously also be equipped with a suitable type of card reader (this may also include a conventional physical card reader which reads the SIM card of the "visiting mobile", removed from the telephone and inserted into the reader), but it may also use mobile telephones for accomplishing a corresponding function, without the need for any external user unit. When a GSM mobile telephone is switched on, same discloses during the initial handshaking operation with the base station its unique "PIN-code/SIM-card" number (amongst other information required to reach correct base station) in a format and according to a protocol which can be read by the now activated described system. If such a number is programmed and stored in the number discriminator as a valid "card code", the mobile telephone acts very much the same as a "proximity card" and the system as a "proximity card reader" which reads the card without direct physical contact, and programming can be performed as "card only", or alternatively as "card-plus-code sequence" with required code sequence being inputted subsequently. The same disadvantages and advantages exist as for a non-keypad code lock, but routine reading of the unique PIN/SIM code for a visitor can also result in advantages such as an improved registration in a transaction memory to relate a certain visitor to misuse, also with regard to conventional entrance communication or code lock situations, who otherwise are completely untraceable. One may also, particularly with regard to installations having high security requirements such as military stores or similar, authorize only a few selected mobile telephones to initiate communication or code lock opening, and also define what certain mobile telephones that should be permitted to do, and additionally possibly include selectively chosen time zones, format changes, variable codes etc., and the initial authentication by the base station of the mobile/the connection results in a general guard against misuse. Apart from the PIN/SIM code etc. transferred "automatically" from the visiting mobile when switched on and conventional dialled number, also other types of automatically or intentionally transferred signals from the mobile can be used for the above code lock/card functions.

Since the described system should include a speech handling unit, mainly in order to detect and decode DTMF signals sent as speech data, same may theoretically also accept voice and speech commands for its functions/actions, but DTMF is believed both simpler and better for the relatively few tasks that an entrance surveillance system has to perform. Possibly, and in order to improve security and use, may given commands consist of longer DTMF code sequences, as well as different command codes for different called inhabitants (based on the different call numbers of same) for same type of actions, or for actions specific for only certain inhabitants, such as permitting a lift to reach a certain floor level, but normally is only one or a few DTMF digits required to achieve required extent of signalling with adequate security, since same in fact must originate from the called party, and amongst other criteria, preferably also within a predetermined time frame in a by the base station authenticated call.

Even though commercially available GSM-scanners can be used for radio frequency scanning and reception, time adjustment and synchronization, and signal/speech decoding required for utilization of the present invention, the speech must never leave its digitized format to be transformed to an analogue signal audible to a listener, each system function is preferably in digital format. Accordingly, when using such devices a considerable part of their functions are not utilized, but since they are available and can be used, same confirms that described functions can be achieved in a number of ways and by use of standard components.

Programming the system according to the invention can be carried out in a number of ways, e.g. in position by means of a serial connection and with a handheld programming device or a PC (or PC-capable mobile telephone), and programming from a PC at a distant location via modem is also possible. In position, the system may also receive DTMF or, if adapted thereto, data via mobile telephone (WAP, SMS etc.) as programming commands, provided that somebody (authorized, e.g. by PIN/SIM number) is in place and establishes a mobile telephone call to an authorized programming telephone, in which case the described system can listen to the communication therebetween and thus receive the correctly formatted programming instructions/commands. It may also be arranged with a connection to a public telephone network for distant programming purposes, as well as, for example, a mobile telephone subscription of cash card type or via Internet, typically not utilized for speech communication, but possibly used, for example, for alarm transmission purposes and surveillance/control purposes of functions within the building.

Non-existence of external physical user units (apart from the antenna, which can be arranged hidden) results in a highly secure substantially non-external installation, protected against external influence and damage, and expensive parts and covers are not required. Normally, only a few instructions are required (even though same may be an electronic display or similar, as well as audio/voice synthesized instructions, which on the other hand increases the costs and the risk for damage, but still remains as a possibility), and with indication of the area within which the mobile telephone should be switched on, even though this is not absolutely necessary for an experienced user, whereby nothing is required that would damage the looks, integrity and security of a beautifully designed entrance, even though same is equipped with an entrance surveillance system. Based on input of a correct telephone number and that same is detected/approved by the number discriminator, same can order connection of a TV camera operating on a channel in a cable TV system, and also via secondary unit give a general "alert" to all TV sets in the building, or based on the dialled number only to the party having said number, in order to disclose that the call resulting in a ring signal is an entrance telephone call (should the called party have the service "caller ID", the telephone number/identity of the calling party is also disclosed) and that the visitor can be seen on TV, prior to responding to the call. A similar function can also be implemented for code/card addressing.

Certain mobile telephones use speech scrambling in order to make the calls safer. Even so, all mobile telephones within a given area must use the protocols for handshaking, dialled telephone number, radio transmission etc. This communication between the mobile telephone and the base station remains within given standards. Only the speech is made subject to speech scrambling and can only be received by another telephone having the same algorithm for speech scrambling. However, it is not a major problem to detect and decode DTMF signals from a scrambled data stream. Since the pair of tones have such a typical configuration and maintain their frequency relationship also when scrambled, they are easily detectable as DTMF signals and their specific internal frequency relationship between the two frequencies identifies the digit.

Ring signals and engaged signals (signals identifying call progress) can also be detected, since they are sent back to the calling telephone from the side of the called telephone, and can thus be detected by the described system and be utilized for additional purposes, for example, as known from existing entrance telephone systems, to start a time period allowed for DTMF detection only as from detection of reply (end of ring signals); the time period allowed for calling (between dialled telephone number and reply) and possibly also to specify separately the time of the call. Many of the above mentioned possibilities are only stated to indicate functions intended to meet certain specific situations, demands and/or design alternatives, and in order to give a general background to the following example of a non-restricting example of an embodiment according to the method of the present invention, described with reference to the accompanying drawings.

BRIEF DESCRIPTION OF DRAWINGS

FIG. 3 shows a flow diagram, illustrating the function of the system according to FIG. 2.

DETAILED DESCRIPTION OF THE PREFERRED EMBODIMENT

Figure 1:
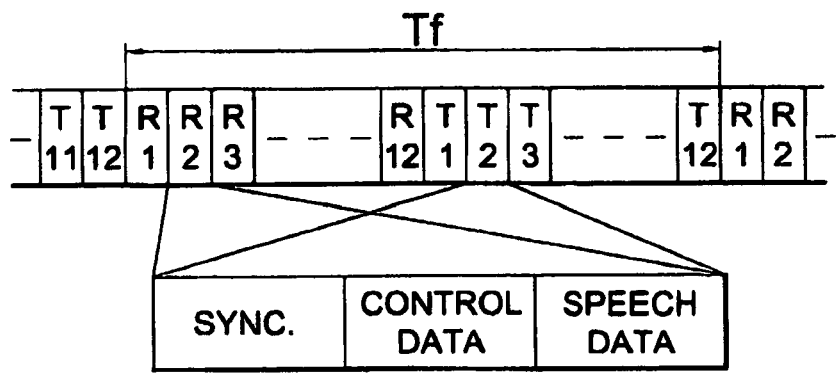
FIG. 1 shows, schematically and illustratively, a digital data stream including bursts of transferred data in a digital radio telecommunication system (in this case, for simplification, DECT)

As previously mentioned, and without intending any undue restriction, the described embodiment will be related to the GSM standard, which, as already mentioned, is a MC/TDMA/TDD format for communication between mobile telephones (not shown) and base stations (not shown). Furthermore, all types of telephones and other "telephone related" apparatus, e.g. modems, computers etc., that can be reached by a call from a mobile telephone are also not shown, and same can be connected to a wired telephone network but also consist of mobile telephones. Earlier (page 2) has the almost Babylonic scenario with regard to available mobile systems been discussed. GSM has today the largest number of users, and this fact is the main reason why same has been chosen for the example of an embodiment. However, also this system is relatively difficult to describe in brief terms. In order to simplified illustrate some common principles for "digital" mobile telephones, FIG. 1 discloses DECT. DECT is allocated certain "frequency bands" for wireless radio communication in which a number of carrier waves are available. Each carrier wave is divided in time periods having twenty-four "time slots". Two time slots are utilized to create a duplex channel, which means that twelve speech channels exist within the range of each carrier wave. Said twenty-four time slots are transmitted as so called TDMA frames having a frame cycle time TF of 10 ms. A typical frame structure for a digital TDMA/TDD communication system is shown in FIG. 1. During the first half of the frame, i.e. the first twelve time slots denominated R1, R2 ... R12, data are received from the base station, whereas during the second half of the frame, i.e. the second group of twelve time slots denominated T1, T2 ... T12, the telephone unit is transmitting data to the base station. A radio connection between a base station and a telephone unit is assigned a time slot in the first half of the time frame and a time slot having the same number in the second half of the time frame. Each time slot normally includes synchronizing data, control data and digitalized speech or user data.

Signalling data, such as data referring to the calling party, dialled telephone number and call progress signals can be included in control data as well as speech/user data.

Digital cellular systems must be even more complicated, but differ from the above by having individual radio frequencies (carrier waves) for transmission and reception (according to present and previous GSM).

Figure 2:
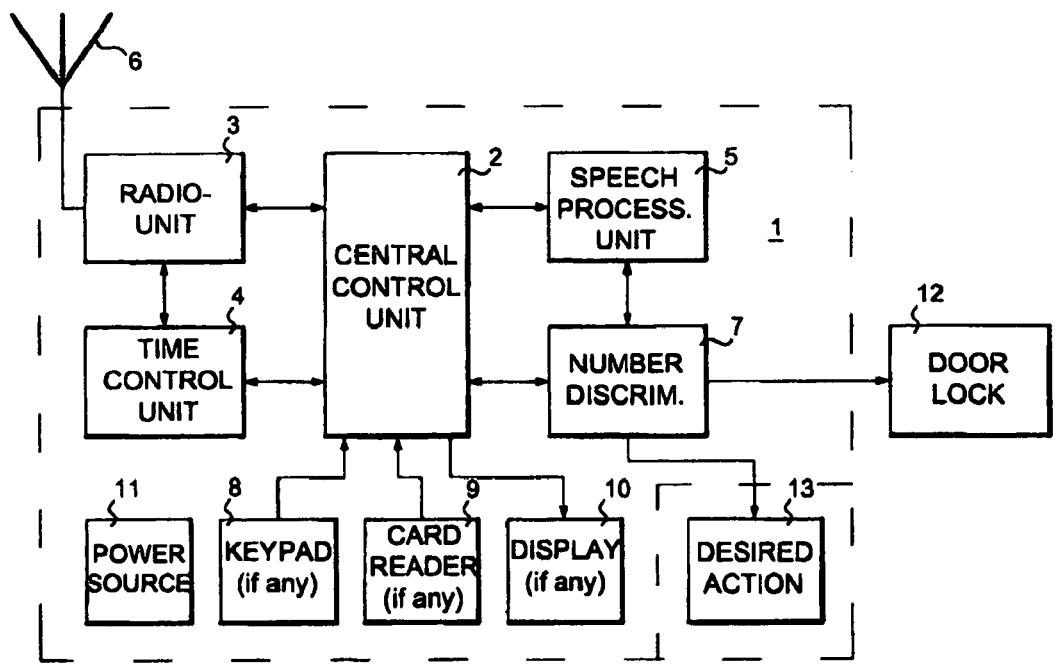
FIG. 2 shows a simplified block diagram disclosing an example of a system according to the present invention.

FIG. 2 shows a simplified block diagram disclosing the described system 1, including four essential building blocks, i.e. a central controlling user adapted logical unit 2, a radio unit 3, a time controlling and synchronizing control unit 4 and a speech treating unit 5.

The radio unit includes an atmospheric interface by means of an antenna 6, connected to the radio unit 3 and including a searching "scanning" part and a receiver/demodulator. Time adaption during reception is controlled by the time controlling unit 4, which, in the case of TDMA/TDD technology, handles synchronization of frames and time slots in a known fashion. The time reference is normally gained from a synchronizing signal received by the antenna 6. Suitable for described embodiment, said antenna is preferably of receive type only, screened and of directional type, whereby same has a very short, narrow and defined reception range wherein same well receives radio signals within the frequency band(s) utilized for mobile telephony within the installed area. During a first phase, which can be called the "resting phase", said antenna can under ideal conditions only be activated by signals from the predetermined area (which usually requires certain calibration in position, e.g. when the system is installed), but a nearly "ideal" condition is also acceptable due to the following protocol. During this phase is the antenna connected to a searching ("scanning") device, which constitutes the first part of the radio unit 3. This searching device searches during the first phase continuously the frequency bands used for a suddenly occurring relatively strong radio signal on any of the frequencies. This is a reason why it is preferred that a visitor should switch on a "disconnected" mobile telephone adjacent to the entrance in order to initiate the entrance telephone procedure. When a mobile telephone is "switched on", it is transmitting with substantially full power in order to secure contact with a possibly distant base station (the output of the telephone may be relatively low in certain areas), and this signal is often considerably reduced due to instructions received from the contacted base station during the initial "handshaking" phase, during which also other parameters for the communication are transferred, followed by a number of initiating routines, or "protocols", which, due to the general character of the situation, must be rather general and repeated and thus easy to understand. As previously mentioned, required decoding of same can be carried out by commercially available scanners, and certain of these can also decode mobile GSM conversations without having performed surveillance of the handshaking procedure. In order to accomplish the present embodiment, such a scanner would be a luxury, since reproduction of speech is not required, and since most of these scanners are built to cover the entire radio spectrum; totally unnecessary in the present case. A discrete circuit, LSI circuit or a few commercially available IC circuits would be more suitable to implement the functions described herein, surveillance/"scanning" only within required narrow bands, and surveillance of the handshaking procedure, and gaining only a few desired parameters from same. Technically can this be accomplished today in a number of ways by a person skilled in the art and by use of commercially available standard components, and in view of this fact a more detailed description of a certain embodiment is not believed required and would only constitute a non-required restriction.

With reference to "handshaking", same also involves that the mobile telephone gives away its PIN/SIM number, which, even it is not necessary for utilization of the basic principle according to the present invention, can be used for many interesting purposes, as already described earlier. However, since this is an added feature within the scope of the invention, no technical solution for the gain and use thereof is described, it is believed sufficient to disclose that this can be carried out technically in a number of ways, and with use of components adapted for this purpose.

The only tasks to be performed by a "scanning" device according to the present embodiment after having been initiated in previously described fashion are (if previously described "proximity card" and/or transaction memory possibility are used, to deal with data including PIN/SIM number or corresponding equivalents and secure that same are transferred for adequate treatment) to connect another antenna (or part of an antenna) facilitating reception at a large distance, which results in reception also from the base station and possibly power reduced mobile telephone signals, and to transfer same to the more stable parts of the radio unit 3. Mentioned reduction/increase of the receiving range can also be carried out in other fashions, e.g. by use of a connectable and disconnectable attenuating unit, and/or receiving range for actual T-frequencies of cellular systems in the area of installation could be kept low (visitor's cellphone near), whereas R-frequencies can be kept high. The system according to the invention now enters into "active" condition, and it is transferred back to "resting" condition after having completed intended/instructed actions, or by disconnection after a predetermined time period. During "active" condition, no "scanning" is performed, since only one visitor at the time requires to be handled at an entrance. With regard to buildings having several entrances scanning and associated procedures can simultaneously be carried out at each not yet engaged entrance, and such satellite stations are preferably by means of a "multiplexed system" connected to a central main unit, which may have the entire capacity for handling calls and the main part of hardware, thereby reducing the costs for the installation.

The central control unit 2 receives data from the radio unit 3. Signalling and synchronization information are removed from received data, and resulting speech data are transferred to the speech treating unit 5, which decodes received data. It should be noted, that according to described embodiment, unless speech/voice commands are utilized, preferably only DTMF signals are of interest, which are included in the flow of speech from the party called by the telephone, and only when a valid and preprogrammed telephone number has been dialled from the visitor's mobile telephone; and that DTMF signals are fairly easy to detect and decode from a speech data stream. Accordingly need only received time slots with "R" speech data (for DECT) or corresponding frequency (in cellular networks) be transferred to the unit 5, which can be of a fairly simple design, whereas the unit 2 preferably maintains received "T" speech data and preferably also all control data for internal treatment, primarily in order to obtain the number dialled by the visitor's mobile telephone and which is transferred after "handshaking" (but possibly also for checking out other inputs from network of visitor). This number may thereafter be compared with the numbers stored/programmed in the number discriminator 7 in order to ascertain whether or not corresponding, and should this not be the case, the system may immediately return to "resting" status. Should comparison establish that the number corresponds to a programmed "code lock number" (if this function is utilized), a door lock, for example, may be immediately unlocked followed by return to "resting". Should comparison establish that the number corresponds to an authorized/programmed "reply telephone number", the unit can be started pending incoming "R" data and for detection of in such data included DTMF signals, and provided that such are located within a predetermined time limit, corresponding to programmed criteria, corresponding action can be performed. After completion of programmed action, and also at reception of a non-valid digit/code command and/or expiration of time period for surveillance, the described system can return to "resting".

In the case of multi carrier wave/multi time frames, such as GSM, the central control unit 2 normally also controls the various combinations of carrier wave frequencies and time frames in a known fashion. In order to minimize the number of required components, the unit 2 may according to the present invention be configured in such a way that same helps the "scanner" to lock on assigned carriers/time frames. According to the described embodiment is the control unit 2 arranged to handle received signal information for decoding a transmitted dialled number from a mobile telephone at the entrance, for comparison with programmed/stored numbers, and for possibly taking actions based on the instructions associated with said number. This is carried out by the schematically indicated number discriminator denominated 7. It should be noted that the number discriminator 7 can be integrated with the control unit 2, and may substantially comprise of a for the purpose adapted micro control circuit, which furthermore may be integrated with the control unit 2 and perform substantially all steps associated with same. It includes an operative memory, in which all operative programs are stored. Furthermore, same also includes memory means including data for a number of decoding algorithms, for example adapted to the type of signalling information that must be decoded for a certain purpose. These decoding algorithms are fetched and treated together with received signalling information to reveal instructions for an action. The memory means also facilitates possibility for adapted and/or personal user programming (which for applications requiring high security, such as military applications, may include memory components which can not be reprogrammed by "external persons"), such as programming/storage of desired actions, choice of decoding algorithms from the users of the system depending on requirements and circumstances, and/or programming of user specific information, e.g. telephone numbers, code lock numbers, numbers for "proximity cards"; if and how this information should co-act; DTMF digits/codes to be used for instructions from the called telephone; etc., as well as temporary information, e.g. parameters relating to time periods whereunder certain functions are allowed/not allowed. In order to allow maximum use of these possibilities, at least one serial port and a real time clock are advantageously arranged.

The system 1 may furthermore include a keypad 8 (and/or, for analogue purposes, an IR receiver, "Bluetooth" receiver or similar), an optional card reader 9 (and/or for analogue purposes, a "biometrical" reader or similar) and an optional display unit 10. It is connected to a power source 11, and is shown connected to an entrance lock 12 for influence of same. A connection to a block 13 is also shown, which is intended to illustrate a number of possible added options, e.g. a TV camera, a device for announcing a visitor via cable network, a light source, transmitting status data, or any other desired device/procedure.

According to the present invention, as shown in FIG. 3, block 14, the described embodiment is normally in "resting" condition, which means that same is continuously "scanning" for a sudden and sufficiently strong radio signal within utilized frequency bands, block 15.

When this occurs, the "scanning" operation is halted, the range of the receiving antenna is increased and surveillance is performed with regard to the initiating functions, the "handshaking" between the mobile telephone and the base station, the PIN/SIM number is possibly collected (if this should be used), and more specifically, locking is performed to utilized carrier wave and assigned time frames for interception of initiated communication, block 16. Block 17 shows a possibly included action, namely a question whether or not a PIN/SIM number has been detected. If the answer is "yes", same is transferred to block 18 (to which also inputted information from a possible optional card reader or similar can be transferred) in order to initiate an associated predetermined action, which is not described here in detail, but unless it is an action of type "card only" the flow of operations must now return to the "no" flow from block 17 to block 19, which, during a predetermined time period, questions whether or not any number has been dialled/transferred from the active mobile telephone. If the reply is "no", the system returns to block 14. However, should the reply be "yes", same is transferred to block 20, where the number is decoded and thereafter transferred to block 21 (to which also a sequencer inputted from a possible optional keypad or similar can be transferred), which ascertains whether or not the received number corresponds to a number programmed into the number discriminator as a "code lock number", and if the reply is "yes" same is transferred to block 22, in which the number is used to initiate desired predetermined function, which is not described here, but the completion of which may reset the system 1 and cause a return to block 14, but with regard to certain applications first influencing block 25. If the reply in block 21 should be "no", the number is transferred to block 23, which ascertains whether or not the number is a telephone number programmed into the number discriminator 7 as a number which at the actual time of day is authorized to control some related functions/actions in the building. If the reply is "no", the system is reset and returns to block 14. If the reply is "yes", the flow of operations is moved to block 24, in which the speech treating unit 5 starts waiting for reception of "R" speech data (i.e. a reply to the telephone call), and if this should occur, detection and decoding of any possible DTMF signals in same during a predetermined time period for this purpose. If "no", the system 1 is reset and returns to block 14, whereas if "yes", decoded digit/digits are transferred to the number discriminator 7 and the flow of operations moves to block 25, in which the number discriminator compares received digits/codes with stored/programmed telephone numbers, commands, time zones etc., in order to establish programmed action for given command. Should no correspondence be established, i.e. "No", the system 1 is reset and returns to block 14; should on the other hand correspondence be established, i.e. "Yes", corresponding action is performed; typically a door lock opening operation (with the unlocking indicated by "buzz", "click" and/or LED), whereafter the system 1 is reset and returns to block 14 (block 26).

The previous description is only intended to serve as an illustrating description of an example of an embodiment according to the present invention. The method in which the described system performs surveillance, detection and identification of activity and signals from the connection of a mobile telephone normally with a base station, and carries out actions associated with related received commands, can today be solved in a number of ways and by use of commercially available components, whereby detailed described embodiments are not regarded as necessary. Those skilled in the art can easily on basis of the present description make alternative designs, which incorporate functions corresponding to the described embodiment and without departing from the basic principles or the scope of the invention. For example, previously described "scanning function" may be replaced by a device which in a more "stationary" fashion is arranged to monitor carriers/frequency bands, and furthermore can mobile telephones already "switched on" be "tapped" with regard to dialled number, and furthermore may also more distantly located telephones in conjunction with one single type of antenna system be used in certain cases and/or a starting sequence for the system can be caused by another means, e.g. a keypad (or similar), a cardreader (or similar) or a pushbutton adjacent to the entrance. Mobile telephones utilizing other types of systems than GSM can be used, many different decoding algorithms/routines can be used to meet various needs and types of answering parties, e.g. machines/computers, and also other command types than DTMF can be used, e.g. speech, SMS, WAP can also be used, and some functions can, provided that the operator supplies such services, be handled/implemented by the base station, and/or may, for example via "menu choice", be included amongst the services and functions included in the mobile telephone, if also supported by the manufacturer. Finally, the possibility (for GSM; in other systems possibly other terms) of constant surveillance (monitoring) of "BCCH" carrier waves from base stations in the area should also be mentioned, whereby correct synchronization is always achieved when a "RACH burst" is detected from an (adjacent) mobile telephone which is being switched on, whereby detection and decoding of parameters in the "handshake" and the call thus is made simplified. One may also, perhaps mainly in an attempt to by-pass the present invention as described and furthermore, not in a particularly advantageous way and without departing from the inventive thought, completely or partly avoid surveillance/analysation/discrimination etc. of "handshaking", PIN/SIM codes, dialled numbers etc., and instead allow created reply codes carry out corresponding authentication/discrimination/etc. of primarily the number dialled from the visiting mobile, and to do this by holding parameters for this purpose, interpretable by the device according to the invention by the corresponding programming of same. The codes generated by replying part—man or machine—will probably be rather large, complex and difficult to handle, but the version is interesting from descriptive point of view, since same discloses a solution whereby only a commercially available GSM scanner is required to accomplish the more special functions of the invention. Quite conventionally can thus all DTM signals in an intercepted GSM call in a known way (for example by a passband filter) completely analogue be gained from the CODEC of the scanner and in a conventional way be handled by a "number discriminator"/processor. Should an intercepted and obtained DTMF sequence correspond to preprogrammed criteria, this would serve as "evidence" of the authenticity of both the number dialled and the command, and this could possibly meet required security, at least for more trivial applications. This is even more conventional, when the "scanner" of the device according to the invention receives a call via the still well used NMT 450 or the analogue alternative of D-AMPS etc. This would require no signal treatment at all. In correspondence with what has been discussed above concerning speech scrambling it will be understood, that signal treatment for only DTMF will be fairly simple, also for GSM, and if the device according to the invention is equipped with a keypad or similar input means, the visitor could be required to input the telephone number called also via these means, for direct comparing and checking with stored approved (OK) numbers, before commands could be valid. Security could with cellular systems be enhanced and/or commands be simplified if at the same time It is prescribed that commands must appear only at R-frequency. In this connection can be mentioned the possibility, provided that the device according to the invention is arranged with a keypad, pushbutton or similar, that the called party during the conversation informs the entrance, programming the device and/or verbally informing the visitor, which code/action (e.g. buttons to press) required, whereby the visitor may "key himself in". If this should occur, the operation is temporary and can not be "publicly known" and thereby misused, and even a simple operation will be safe enough. Also more complicated methods can be used. For example, should there be an entrance set having a microphone able to receive verbal or DTMF commands, the visitor can be requested to press the loudspeaker of the mobile against this microphone, whereafter the called party sends an opening command (which does not require to be changed), hopefully unheard by the visitor. If at same occasion the "mic" a of the visiting mobile is pressed against a possible loudspeaker of the entrance set, same can reciprocate back e.g. status information to the called party, which i.a. would render it possible for an entrance set to communicate with a party answering to the mobile call, even having no telephone network connection/subscription of it's own, and in such case could be specifically advantageous when the party called by the visiting mobile is a machine; e.g. a computer/database for down/upload in real time. By means of such a device, much resembling the old-fashioned "cradle modems" of early computers, the party—most probably a machine—initially called up (and possibly further informed/directed) by the visiting mobile, may then have a direct contact and dialogue with the entrance set, after some appropriate activation of same (e.g. some of the above mentioned starting sequences, or simply, a mobile being put against the cradle), whereupon all the rest of the transaction, including parity check, can be carried out by and between these two parties, evidenced by the codes etc. they'll exchange. In such a case an "entrance set" could also function quite well even having no scanner/radio unit. For certain applications, particularly single family houses, a wired circuit from the inhabitant to the entrance set can cause opening (for example by galvanical dosed circuit) during conversation, but the functional possibilities will be restricted to the influence caused via the wired circuit. For example, apartment building, common logical commands can be known methods and means injected in and transmitted over existing "galvanical" network (e.g. cable TV system, electric wiring) within the building and be made to activate a door lock, TV camera etc. Without anything further, such activation must however be accepted from anywhere in the building and at any time, making for much disorder/confusion. An authorization of the validity of commands by means of an entrance set would, as herein described, be advantageous. However, for low-end requirements of security and more stress on convenience/cost, a fair compromise could be that the entrance set acts and ordains such, that such commands are valid only when at the same time it receives a radio signal (no decoding necessary) from an active mobile (a signal on any of the T-frequencies allotted for mobile phones in the area of installation; no R-frequency reception necessary) in the very near proximity (antenna well shielded) of the entrance. Thus, only when a mobile call actually is taking place from outside the entrance, anyone from within the building can give any command with effect at the entrance; and the fact that any effective command must arrive on the internal network, works as "code" or criteria in retrospect evidencing the validity etc. of given commands well enough for the chosen level of security. These, and possibly other more or less cunning modifications pertaining to how the called party shall be able to give functional commands influencing the system after replying to a mobile call authorized by a listening entrance apparatus give fair security against damage from visitors, particularly if the above time zone/authorization/transaction memory criteria with PIN/SIM numbers and called number are included, but are generally not preferred, since the simplest, straightest and most versatile use is accomplished according to the described and preferred embodiment.

Use of an adapted GSM scanner has already been discussed. With regard to suitable types of components, Siemens offers a GSM module, which for the purpose includes unnecessarily many functions, since same also can handle transmission, microphone, loudspeaker, CODEC/DA-transformer, SIM card interface etc., which are not used according to the present invention. Due to similar reasons are also so called GSM chip sets offered by, amongst others, Philips and Mitel to advanced, even though possible a restricted number of such circuits can be used cost effectively. Motorola has recently released a circuit, DSP 56690, which can handle mostly everything and covers all standards, and other manufacturers are about to release similar type of circuits. With regard to micro control means has, for example, Dallas DS2250(T)-64 64 Kb RAM for storage of program and/or data, and the circuit also includes a serial port having full duplex and a real time clock, which thus is more than sufficient for the described embodiment.

The present invention can also be used for other purposes than surveillance of a building, e.g. for car parks, access to computers or machinery, rental cars, dispensers for purchase or issuance of travel tickets and similar, ATMS, "toll"-roads/bridges, control points for night watchmen, border surveillance, time/presence charting systems, "distant control" of garage doors, car locks/alarms, etc. For example, with regard to the last mentioned application speech communication/telephone call need not be connected through, since there a replying party often does not exist, and the communication will thus be one-sided of controlling character, whereby the claimed invention can be utilized in a simpler and more of the type special purpose mainly utilizing above discussed card/code features; for example may no speech processing unit 5 be required and/or scanner, and same may apart from base station related radio communication also in certain cases use infrared (IR) communication and/or "Bluetooth" (or similar standard) short range radio communication as an alternative, since modem radio telephones often are arranged to facilitate such communication in the near range of the mobile telephone. Also with regard to other applications may IR/Bluetooth communication serve as an alternative, and such communication is therefore included with regard to described embodiments when the notion radio communication has been used. When using IR/"Bluetooth"

communication. It is also possible, via corresponding transceiver for the controlled object, to establish a reciprocal "dialogue", whereby the controlled object also may transfer for example status data to the controlling mobile (which of course also is possible with regard to previously described mobile-base station-related "code/card"-communication, but would involve further complications; either some sort of subscription, or granted permission for the controlled object, in order to radio transmit back in the established carrier format, via base station or direct, to the mobile "in sync", respectively, and hence is viewed less preferable, at least for low cost applications), which PIN/SIM number, inputted code numbers etc. also, for example by a menu choice at the mobile telephone, can be transferred via the same link and thus be used for authorization checkup, transaction memory etc. Since "Bluetooth" (in difference to conventional GSM communication) is fairly easy to intercept and copy transmit, should for many cases IR be preferred, which (if well designed) is extremely difficult for intruders to intercept, and thus would be preferred for transfer of confidential information. "Hybrid" solutions, where e.g. a base station related code/card addressing, as primarily earlier herein disclosed, is reciprocated by Bluetooth/IR to an adapted mobile, is another alternative. In this context can also be noted the inherent possibility with mentioned transceiver of the controlled object, to react and transmit e.g. alarm status data even remotely to a correlated "master" mobile upon sensing e.g. intrusion. This can by substantially conventional alarm transfer techniques be accomplished over all above mentioned communication formats, but with widest reach for radio communication; either Bluetooth with possibly increased output power, or base station linked call. Also by such a transceiver, the visiting/controlling mobile can "in conversation" be requested to furnish complementary real time ID-data, such as time-zoned or "rolling" passwords, to enhance security. If the transceiver has (e.g. pre-paid card) mobile network connection, it can also be reached from a distant telephone, e.g. for programming. However, to allow e.g. disarming, opening etc. from far away, would not be very apt for cases like e.g. car locks/alarms, nor very safe if then such actions could only be triggered from a nearby (and pertinent) mobile, e.g. only by Bluetooth/IR (and required PIN/SIM number), remote programming, status transmission, up/down-load etc. via base station could be maintained, while still offering good security. If having no mobile network connectivity, the controlled object/entrance set may still, e.g. by Bluetooth/IR, instruct the visiting mobile to (e.g. by WAP data messages) convey entrance set specific status information, up/down-load in real time etc. to/from a party—man or machine—called by the mobile (in a way as disclosed herein above for the preferred embodiment).

A further solution resulting in all functions and features of the invention, but involving only known and conventional components and techniques, and without any need for scanners, D/A-transformation etc. will now be disclosed. The entrance apparatus may according to the invention namely be arranged in a conventional way connected to a fixed or mobile telephone network, Internet or similar. It may thus be called in a conventional way from the visitor's mobile. Its own number may be secret, only shown by the entrance, to avoid calls from distant locations, or it may be temporary and variable and shown on a display by the entrance, readable by a visitor; or it may only accept calls after operating a pushbutton, keypad, cardreader etc. by the entrance, by accepting addressing by conventional Bluetooth/IR communication only, or by other means (e.g. in combination with GPS) ascertaining that the visitor really stands just before the entrance. Possibility for programming etc. per a remotely reachable (secret) number can also exist. The call number is dialled by the visitor on the mobile, and the caller is thus conventionally connected to the entrance apparatus and may then communicate therewith, i.e. send and receive commands. The visitor can now be requested to dial a code number, which can be constantly shown on a name-number-board at the entrance, or alternatively may the call number (shown at the entrance) include components for selective calling (only to parties at present in program/memory). Based on this code/component and remaining design/program can the entrance apparatus now quite conventionally, for example according to the "three parties call service", establish a conference call between the visitor, the party to be called and itself, whereby the first two parties can talk (possibly Bluetooth/IR-linked between visitor and entrance set), whereas the entrance apparatus a silent listener await/monitor for given commands, which can be given by the called party and reacted to in accordance with the described preferred example of an embodiment. By means of caller identification (caller ID), it is possible to a certain extent copy functions based on PIN/SIM numbers, and for safeguarding that commands are only recognized from the called party can also thus, by line "checking" or by applying some of the above discussed methods for "In retro OK:ing", be cared for. However, also this solution is regarded as non-preferred, since same involves permission for connection and connection charges (subscriber and call charges), but same is mainly disclosed as an example of a technical solution within the scope of the inventive thought. If in this solution conventional Bluetooth/IR is the designated intermediator between visitor and entrance set, a call could be free of cost for the visitor, though; a three parties call service via the subsistent network could be replaced by an essentially conventional "two parties" call; and would PIN/SIM-numbers for the visiting mobile be easily possible to request and receive for enhancing security, transaction memory etc. Also in this solution, a called up and answering party may be a machine, e.g. a computer/database, and up/down-load in real time etc. between the two "machine" parties is facilitated by their network interconnection. Nevertheless, the above apprehended "administrative" disadvantages with this solution might very well remain and overweigh.

Described example of an embodiment and stated examples of fields of use are thus in no way intended to serve as a restriction in relation to the inventive thought and the method and the device as defined in the following claims. Accordingly, also embodiments are possible in which generated control codes afterwards are used to complete/authorize and/or verify the authority/relevance of an initially dialled number and/or commands; control function signalling/effectuation can be accomplished in many different ways while maintaining authentication/authority for the command; transforming elements, scanner/radio receiver/DA-converter may also be substituted by a substantially conventional telephone network connection with call possibility; and call numbers inputted to the mobile telephone can be substituted by (menu chosen) depressed buttons, speech commands, code input etc.

Finally, apart from PIN/SIM number, the present invention may also make use of the unique serial number ("International Mobile Equipment identity"—IMEI) allocated to every mobile radio telephone when manufactured, and this number is also made available during the handshaking process and can thus identify a specific mobile radio telephone.

What is claimed is:

1. A device for utilization of mobile radio telephones for surveillance and/or control purposes, the device comprising:
    a receiving radio unit with associated receiving antenna having a searching scanner function, for reception of the frequencies which within a related geographical area are used for mobile radio telephone communication, the receiving radio unit to be activated in a first step by an incoming signal from a mobile telephone;
    a central control unit and a time related synchronizing unit for analyzing the received signal with regard to a PIN/SIM number or corresponding ID and dialed call number for surveillance and decoding of completed hand shaking procedure between the mobile radio telephone and an associated base station and thereby reported PIN/SIM number or corresponding information and and/or from the mobile radio telephone transferred called number; and
    means, when correspondence is established, for initiating performance of preprogrammed procedures and influencing on predetermined devices, in conformity with corresponding stored information to initiate a predetermined process or action, and should correspondence not be established, returning to a "resting" and listening condition pending a new inputted signal from a mobile telephone.

2. Device according to claim 1, characterized in, that the receiving radio unit is arranging having a restricted reception range, and that said range is extended when an incoming signal has been determined as a call to a preprogrammed subscriber, and that the radio unit thereafter during a predetermined time period listens to the communication channel of the called subscriber via speech treatment unit for pre-programmed commands in the form of DTMF signals, the receipt of such an approved command resulting in performance of an associated predetermined procedure or action, and otherwise can result in return to "resting" and listening condition pending a new inputted signal.

3. Device according to claim 1, characterized in, that the central control unit also is connected to be influenced by a user operated physical input means, and that commands via such a means are arranged to individually, or in combination with or interchange with information obtained from a mobile radio telephone, result in initiation for performance of a predetermined procedure and action.

4. Device according to claim 1, characterized in, that the receiving radio unit, when an approved call to a subscriber has been confirmed, is arranged to change to listening of a speech data stream of the called subscriber, and thereby only receive and accept possible commands existing in the speech data stream of the called subscriber, introduced as DTMF sequences, speech commands or the like.

5. Device according to claim 1, characterized in, that a number sequence dialed from a mobile telephone preferably commencing/concluding with a non-numerical part or similar type of input, is received and interpreted as a direct command, which, when corresponding to a preprogrammed command, results in initiation and performance of a predetermined process or action.

6. Device according to claim 1, characterized in, that the geographical receiving range of the receiving radio unit in "resting" condition is so restricted, that same substantially only will react on signals resulting from a mobile radio telephone which is switched on from disconnected condition within the receiving range, when the mobile radio telephone with substantially full output power, contacting "bursts", or similar, attempts to establish contact with an adjacent base station in order to perform a handshaking process.

7. Device for utilization of mobile radio telephones for surveillance and/or control purposes, the device comprising:
    a receiver for reception of signals from mobile radio telephones, the receiver to be activated in a first step by an incoming signal from a mobile telephone;
    means for analyzing the received signal with regard to a PIN/SIM number or corresponding ID and dialed call number for comparison with preprogrammed corresponding data;
    means, when correspondence is established, for initiating performance of preprogrammed procedures and influencing on predetermined devices, and should correspondence not be established, returning to a "resting" and non-activated condition pending receipt of an incoming signal from a mobile telephone; and
    means for creating a conventional connection to an entrance apparatus when a call number is inputted by a visitor on a mobile radio telephone the conventional connection to an entrance apparatus being for communication therewith, for sending and receiving commands, and that the entrance apparatus, based on received commands, is arranged to establish a connection between the visitor, the party to be called and itself, whereby the first two parties can talk, whereas the entrance apparatus as a silent listener awaits or monitors for given commands, which can be given by the called party and reacted to in accordance with the preprogrammed actions.

* * * * *